United States Patent [19]
Busso et al.

[11] Patent Number: 4,713,619
[45] Date of Patent: Dec. 15, 1987

[54] ELECTRONIC DEVICE FOR FEEDING ION PUMP

[75] Inventors: Mario Busso, Torino; Marco Pierini, Genova, both of Italy

[73] Assignee: Varian S.p.A., Leini, Italy

[21] Appl. No.: 799,411

[22] Filed: Nov. 19, 1985

[30] Foreign Application Priority Data

Nov. 28, 1984 [IT] Italy ................. 68182 A/84

[51] Int. Cl.⁴ .................. G01L 21/30; F04B 37/14
[52] U.S. Cl. .................. 324/460; 315/111.91; 324/71.1; 417/49
[58] Field of Search .......... 324/460, 71.1, 71.3; 323/255, 258; 363/21; 315/276, 278, 279, 254, 257, 111.91, 111.01; 417/49

[56] References Cited

U.S. PATENT DOCUMENTS

| | | | |
|---|---|---|---|
| 2,504,017 | 4/1950 | George et al. | 323/257 |
| 2,993,638 | 7/1961 | Hall et al. | 315/111.01 |
| 3,429,501 | 2/1969 | Hamilton et al. | 417/49 |
| 4,559,591 | 12/1985 | Grünsch | 363/21 |
| 4,574,223 | 3/1986 | Pitel | 323/258 |

Primary Examiner—Reinhard J. Eisenzopf
Assistant Examiner—Robert W. Mueller
Attorney, Agent, or Firm—Austin R. Miller

[57] ABSTRACT

An electronic device for feeding an ion pump with two different tensions and for improved measuring of the pressure in the pump, the two different tensions being a normal operating tension and a lower tension at which a correct measurement of the pressure can be made in a pressure range up to beyond $10^{-10}$ torr. through a transformer whose primary or secondary winding is divided into two sections that can be connected and separated by switches controlled by oscillator circuits. Alternatively feeding at two different tensions can be obtained by feeding to the primary winding of the transformer a pulsed tension having a rectangular wave form and a high frequency controlled by a field effect transistor having an isolated gate. A sampling and holding circuit permits the pressure to be measured only in the conditions of feeding at the lower tension.

9 Claims, 10 Drawing Figures

ELECTRONIC DEVICE FOR FEEDING ION PUMP

BACKGROUND OF THE INVENTION

This invention relates to an electronic device for feeding an ion pump with two different tensions and for improved measuring of the pressure in the pump.

In an ion pump, the output current I is an almost linear function of the pressure P in the pump as expressed by the relation $I = Kp^n$ where K is a constant and n is generally between 1 and 1.2.

Thus, the ion pump can be used as a vacuometer in which the pressure value can be obtained from the current on the basis of the following relation:

$$p = \left(\frac{1}{K}\right)^{\frac{1}{n}} \cdot I^{\frac{1}{n}} \quad (1)$$

On the other hand, the current supplied by the feeder generally is the sum of the following contributions: $I_T = I + I_D + I_{EC}$ where $I_D$ is the leakage current of the feeder, cables and high tension connector, and $I_{EC}$ is the electronic current emitted by the cathode by field effect.

As $I_T$ is the only quantity that can be measured directly, and thus can be converted into pressure by the relation (1) recited above, the reading will only be reliable if and when the values $I_D$ and $I_{EC}$ are negligible relative to I as $I_T$ and I can thus be confused.

Now, as $I_D$ can be made negligible by adopting appropriate constructive measures, $I_{EC}$ varies in an unforeseeable manner with the life of the pump and can reach values of the order of 100 $\mu$A, thus limiting the field of reliability of the pressure reading to about $10^{-6}$, as shown by the curve "a" in FIG. 1, which represents a typical current - pressure diagram at a feeding tension of 7 kV.

Therefore, the known ion pumps meet with a serious limitation when used as vacuometers as generally they are not reliable for measuring pressures below $10^{-6}$ torr.

On the other hand, as $I_{EC}$ varies, as said before, with the life of the pump, it is known to periodically reduce the field effect current by the hi-potting technique.

This technique consists in disconnecting the pump from its feeder to connect it to another feeder (hi-potter) capable of supplying a tension that is much higher than the normal tension, for example 15 kV.

It is evident that this technique is disadvantageous for most applications as it requires a manual intervention step with stopping of the pump for a relatively long time.

It is therefore an object of the present invention to eliminate or reduce the above-mentioned disadvantages of the known ion pumps and to provide an electronic feeding and measuring device which permits the ion pumps to be used as vacuometers for measuring pressures below $10^{-6}$ torr. and to be reliable at this measure up to pressures of above $10^{-10}$ torr.

SUMMARY OF THE INVENTION

These and other objects and advantages of the invention, which will become apparent from the following description, are achieved according to the invention by an electronic device for feeding an ion pump and for improved measuring of the pressure in the pump, comprising a transformer and means for rectifying and filtering the alternating current coming from the transformer, characterized in that the transformer is controlled by means adapted to cyclically apply to the ion pump a first relatively high tension and a second lower tension and in that it comprises an electrometer for detecting the current feeding the pump as well as means for converting into pressure values only the current values relating to the feeding at the second lower tension.

DESCRIPTION OF PREFERRED EMBODIMENTS

Figure 2:
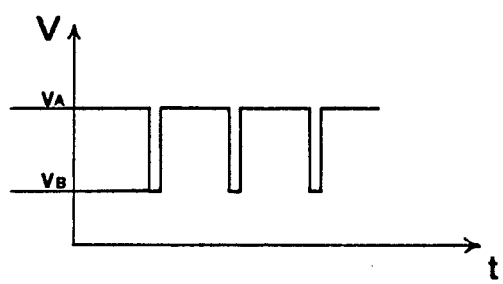
FIG. 2 is a diagram illustrating the behavior of the feed tension as a function of time in the electronic device according to the invention.

As previously mentioned, the invention relates to an electronic device for an ion pump capable of supplying two different feed tensions, one of them being the normal operating tension (e.g. 7 kV.) and the other being a lower tension (e.g. 3 kV.). Such a situation is schematically illustrated by the diagram of FIG. 2 which shows the variation of the feed tension as a function of time.

This diagram shows that the electronic device according to the invention for a certain time supplies a tension $V_A$ (e.g. 7 kV.) and for a definitely shorter time, and thus a time that is irrelevant to the perfect operation of the ion pump, a tension $V_B$ (e.g. 3 kV.).

Figure 1:
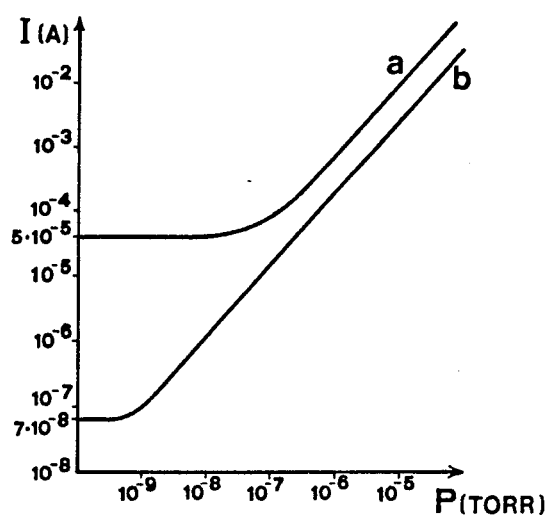
FIG. 1 is a diagram illustrating the typical current-pressure behavior in an ion pump.

As with feeding at low tension, a field of linear dependence extends between current and pressure (cf., for example, the curve b of FIG. 1 relating to feeding at 3 kV.), if a measurement is made under these conditions, it is possible to determine even very low pressures of, for example, beyond $10^{-10}$ torr.

Figure 3:
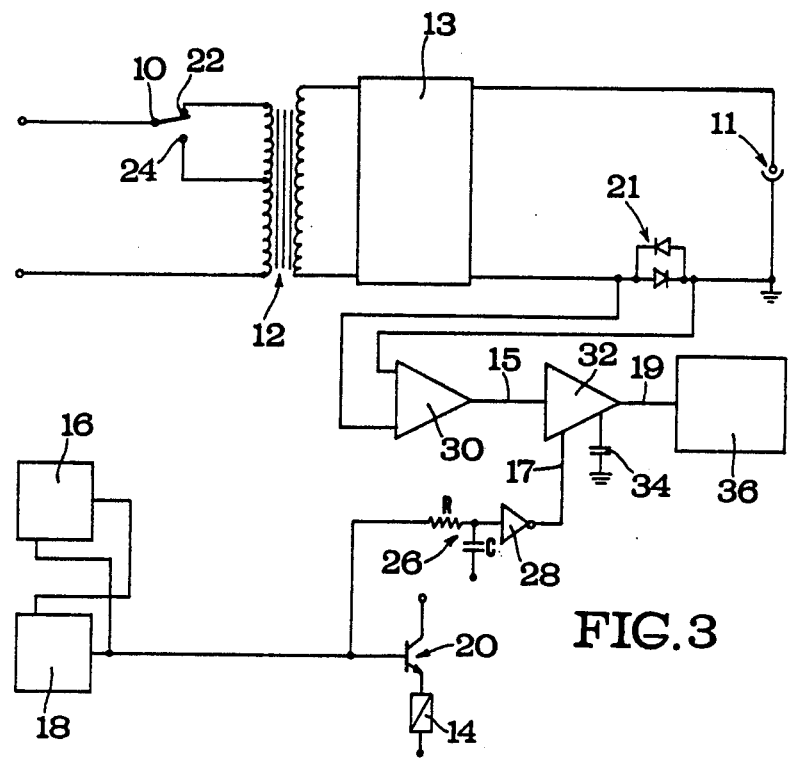
FIG. 3 schematically illustrates a first embodiment of the electronic device according to the invention.

FIG. 3 schematically shows a first embodiment of the electronic device according to the invention.

In the initial portion of the circuit there are indicated contacts 10, 22, 24 of a relay 14 for switching over the feed tension applied to a transformer 12. This switching over serves to vary alternatively the tension at the secondary winding of the transformer so as to provide two tensions for operation of an ion pump 11 (e.g. at 7000 volts and 3000 volts). The diagram also comprises a rectifying and filtering group 13 adapted to feed the ion pump 11.

Figure 4:
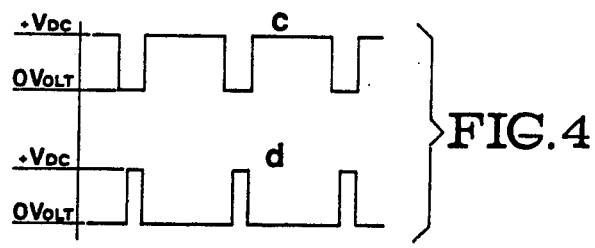
FIG. 4 shows the wave forms relating to some components of the electronic device of FIG. 3.

Switching over of the relay 14 is controlled by two oscillators 16 and 18 according to a well defined timed cycle represented by the diagrams "c" and "d" in FIG. 4.

When the output tension of the oscillators 16 and 18 is at a high level, which can be identified as the continuous feed tension $+V_{DC}$, a transistor 20 becomes conductive and the relay 14 is activated and closes the contacts 10 and 24. In this position there is the greatest tension induced in the transformer 12 (e.g. 7000 V).

When the output tension of the oscillator 18 falls to the level of 0 volt, as shown by the diagram "c" of FIG. 4, the relay 14 is no longer traversed by current and is deenergized to close the contacts 10 and 22. In this position there is the smallest tension induced in the transformer (e.g. 3000 volts).

As mentioned previously, the time of energization and the time of deenergization are the exclusive bond of the oscillator group 16 and 18 and therefore must be selected to provide a time cycle of the type shown in FIG. 2.

The output tension of the oscillators 16 and 18 is also supplied to an RC delay group 26 and an inverter group 28 at the output of which it is found again with a wave form like that indicated by the diagram "d" in FIG. 4.

The ionic current is continuously read by an electrometer 30 whose input signals are picked up by a rectifier group 21. The ouput signal of the electrometer 30, which is proportional to the ionic current, is supplied to the analog input of a sampling and holding circuit 32.

The sampling and holding circuit 32 is formed of three parts: an analog input 15 with the information coming from the electrometer 30, a logical input 17 with the information coming from the inverter circuit 28, and a memory circuit formed by a capacitor 34. The analog information is transmitted to the output only during the period of time in which the logical input is at the level of the continuous feed tension $+V_{DC}$ (diagram "d" in FIG. 4) whereas during the time in which the logical input is at zero volt, at the output 19 of the circuit 32 only the last information is present which was received before switching over of the logical input from $+V_{DC}$ to 0 volt which in turn was stored by the capacitor 34.

On the basis of the above explanations it may be summarized that only the readings of the ionic current, made when the high tension feeding of the ion pump is at the lowest level (e.g. 3000 V), are transmitted to the circuit part 36 which provides for current to pressure conversion and thus provides the measure of the pressure.

Figure 5:
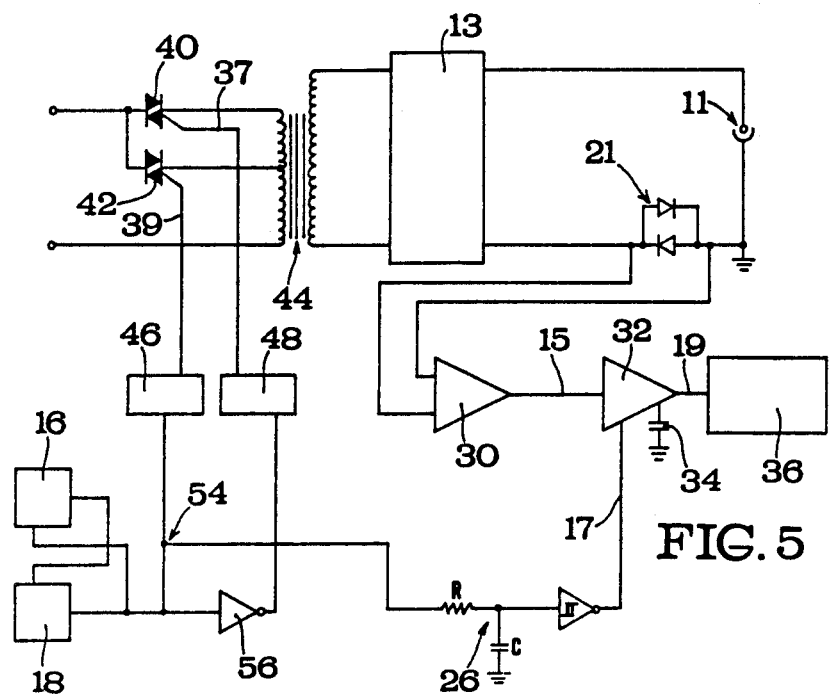
FIG. 5 schematically illustrates a second embodiment of the electronic device according to the invention.
Figure 6:
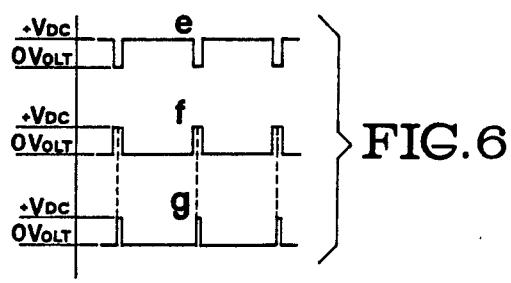
FIG. 6 shows the wave forms relating to some components of the electronic device of FIG. 5.

FIG. 5 schematically shows a second embodiment of the electronic device according to the invention. In the initial portion of the circuit there are two triacs 40, 42 which have the function of switching over by operating in the following manner: when the gate terminal 37 is supplied with a tension, the triac 40 behaves like a closed switch and permits the current to pass to the transformer 44. However, when no tension reaches the gate 39, the triac 42 behaves like an open switch. The phases of opening and closing of the two triacs are controlled by appropriate trigger circuits 46, 48, 56 for switching over according to time cycles indicated by the diagrams "e" and "f" in FIG. 6, which are opposed to each other. The triacs are in the conductive phase when the signals of the two cycles "e" and "f" are at their maximum level $+V_{DC}$. Therefore, at any moment one, and only one, of the two triacs is conductive to feed the primary circuit of the transformer 44 to which it is connected.

The signal is then picked up at the point 54 and supplied to the following circuits which operate in the manner already described with reference to the circuit of FIG. 3.

These circuits have been given the same numbers as indicated in FIG. 3 to the description of which reference is made for an analysis of their specific function.

Figure 7:
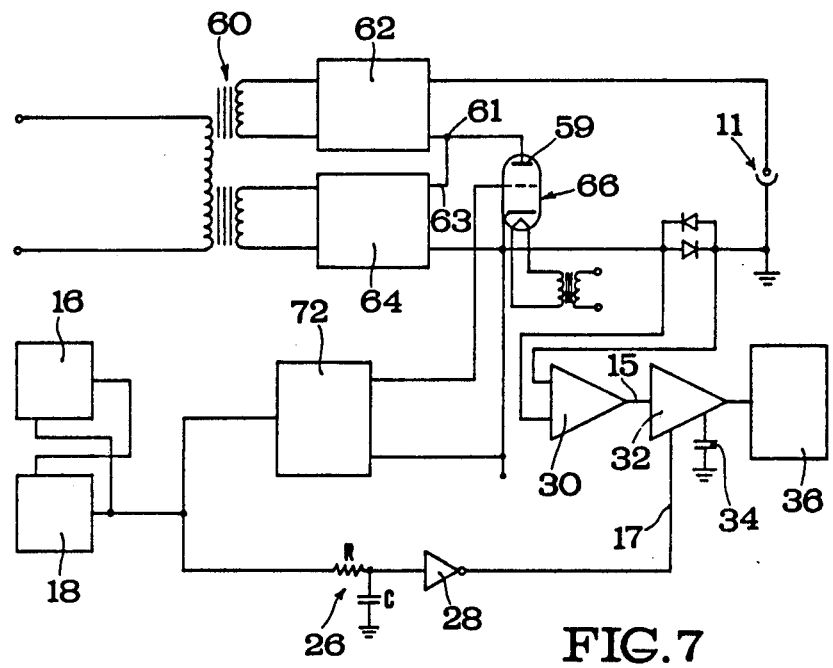
FIG. 7 schematically illustrates a third embodiment of the electronic device according to the invention.

FIG. 7 schematically shows a third embodiment of the electronic device according to the invention.

In this third solution, the two tensions feeding the ion pump 11 are obtained by acting directly on the high tension portion of the circuit.

The transformer 60 has two secondary windings which in turn feed the rectifying and filtering circuit 62, 64. The outputs of the two circuits 62, 64, one e.g. of 3000 volts and the other e.g. of 4000 volts, are connected in series to provide in combination a maximum tension of 7000 volts.

A common pole 61 of the two outputs is applied to an anode 59 of a power triode 66.

Figure 8:
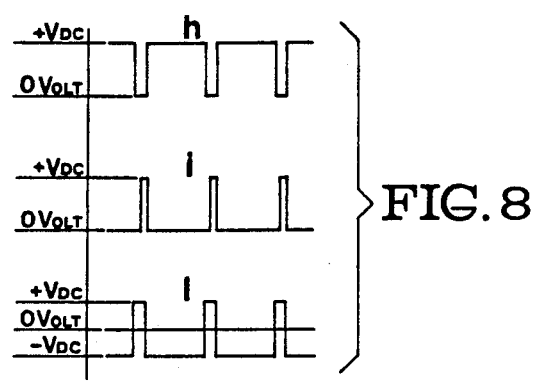
FIG. 8 shows the wave forms relating to some component of the electronic device of FIG. 7.

The grid circuit of the triode is controlled by the oscillator groups 16 and 18 and an interface circuit 72. At the output of the oscillator groups 16 and 18 there is the wave form represented by the diagram "h" in FIG. 8 and this wave form is transmitted to the interface circuit 72 which provides for varying it to make it as shown by the diagram "i" in FIG. 8. From the cycle "i" in FIG. 8 it can be seen that the grid bias tension of the triode varies from negative to positive values.

In the time in which the grid tension is negative, the triode behaves like an open circuit and consequently there is the maximum tension (e.g. 7000 volts) at the ion pump 11. On the contrary, when the grid tension is positive, the triode 66 behaves like a closed circuit, the output 63 of the circuit 64 (e.g. 4000 volts) is brought to 0 volt and therefore the ion pump 11 is supplied only with the tension provided by the circuit 62 (e.g. 3000 volts).

The remaining circuits operate as described with reference to FIG. 3. These circuits have been given same numbers as indicated in FIG. 3 to the description of which reference is made for an analysis of their specific function.

Figure 9:
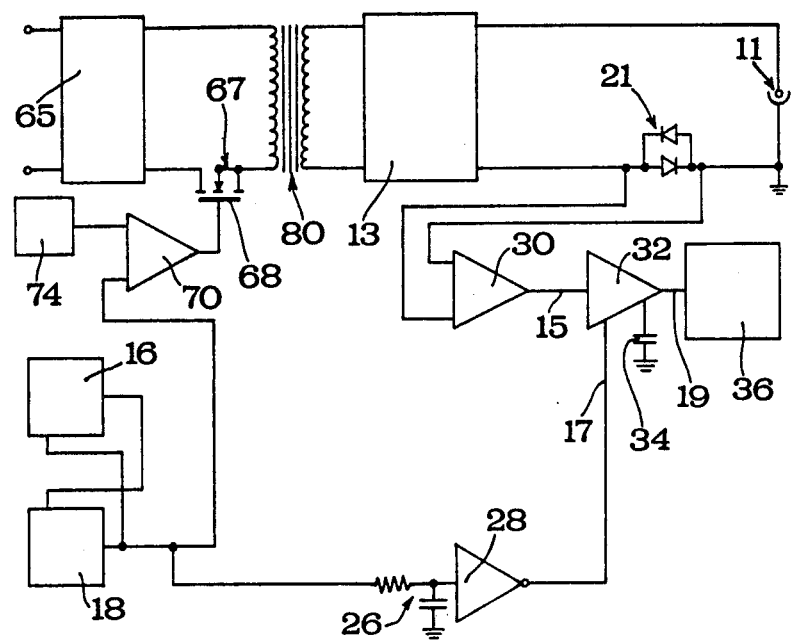
FIG. 9 schematically illustrates a fourth embodiment of the electronic device according to the invention.

FIG. 9 shows a fourth embodiment of the electronic device according to the invention.

It is known that when a pulsed tension is fed to an electrolytic capacitor, at the ends thereof a tension can be measured whose medium value is proportional to the phases of the cycle.

Starting from this consideration there has been devised the fourth embodiment of the invention which is described hereinafter.

Applied to the primary winding of a transformer 80 is a pulsed tension having a rectangular form and high frequency (for example, 10 kHz).

By appropriately varying the phases forming the cycle it is possible to obtain two different tensions at the output of an LC rectifying and filtering group 13.

In this case, too, as in the previously described cases, the feed tension of the ion pump 11 will be, for example, 7000 and 3000 volts.

Figure 10:
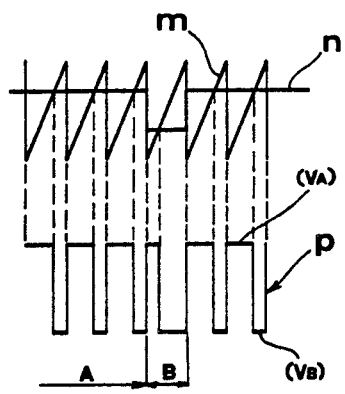
FIG. 10 shows the wave forms relating to some components of the electronic device of FIG. 9.

In the initial portion of the circuit there is a generator 74 having a triangular wave shown in FIG. 10 and whose output is connected to an input of a comparator 70. Applied to the other input of the comparator is a wave of rectangular form n which is also shown in FIG. 10 and is generated by the oscillator group 16, 18.

The comparator 70 has the function of comparing the two input wave forms and provides a rectangular output wave p shown in FIG. 10. The cycles forming this wave are: at a "high" level $V_A$ when the tension Vm of the triangular wave is smaller than the tension $V_n$ of the rectangular wave and vice versa at a "low" level $V_B$ when the tension of the triangular wave $V_m$ is greater than the tension $V_n$ of the rectangular wave.

On the basis of the above explanations, these levels of tension can be applied to an element for switching over, named field effect transistor 67 with isolated gate (MOSFET) which operates as a switch the operation of which will be described hereinafter. When a tension $V_A$ of high level is applied to its control electrode 68, it acts as in a short circuit and therefore current passes into the primary winding of the transformer 80; vice versa, when the tension $V_B$ of the electrode 68 is at a low level, there is an open circuit and the transformer is not fed.

The form of the wave applied to the control electrode 68 is indicated by p in FIG. 10 and this wave is fed to the primary winding of the transformer 80. This same wave form is transmitted to the secondary winding of the transformer and subsequently applied to the LC rectifying and filtering circuit 13.

On the basis of the above explanations it will thus be found that at the output of the LC filter 13 the continuous tension fed to the ion pump 11 will be: high (e.g. of 7000 volts, cycle A in FIG. 10 p), wherein there will be a prevalence of high level, and, vice versa, low (e.g. of 3000 volts, cycle B in FIG. 10 p) in the phase in which there will be a prevalence of low level.

The remaining circuits operate as described with reference to FIG. 3.

These circuits have been given the same numbers as those indicated in FIG. 3 to the description of which reference is made for an analysis of their specific function. From the foregoing description of the four embodiments of the electronic device according to the invention it will be evident that it is possible to apply to the ion pump two different tensions according to a programmed cycle and to effect measuring of the pressure at the feeding of the lower tension, thus obtaining the advantages mentioned in the preamble to the description.

Although some preferred embodiments of the invention have thus been described in detail, it is to be understood that the invention is not limited to these precise embodiments and that numerous changes and modifications obvious to one skilled in the art may be made therein without departing from the scope of the invention as defined by the appended claims.

We claim:

1. In an electronic device for feeding an ion pump and for improved measuring of the pressure in the pump, said device including a transformer having a primary winding divided into two sections, means for rectifying and filtering alternating current supplied by said transformer, and an electrometer for detecting the current fed to said pump, the improvement wherein said transformer is controlled by a means for cyclically applying to said ion pump a first relatively high voltage and a second lower voltage, and further comprising means for converting into pressure values only the current values relating to feeding of said lower voltage.

2. An electronic device as claimed in claim 1, further comprising switch means for separately or jointly activating said sections of said primary winding of said transformer, and oscillator circuits for cyclically actuating said switch means for feeding said ion pump with said first relatively high voltage and said second lower voltage.

3. An electronic device as claimed in claim 2, wherein said cylically actuated switch means comprises a pair of triacs and trigger circuits for actuation of said triacs.

4. An electronic device as claimed in claim 1, wherein said transformer has a secondary winding divided into a first section individually operable to provide said lower voltage, and a second section connectable in series to said first section to provide said relatively high voltage and further comprising a triode for connecting and separating said two sections, and oscillator circuits for controlling said triode, and an interface circuit interposed between said oscillator circuits.

5. An electronic device as claimed in claim 1, wherein said means for cyclically applying to said ion pump a first relatively high voltage and a second lower voltage comprises transistor switch elements having a field effect with isolated gate.

6. An electronic device as claimed in claim 5, comprising rectangular wave oscillator means and triangular wave oscillator means for generating a pulsed voltage to be fed to said ion pump, comparator means for comparing the output signals of said rectangular wave oscillator means with the output signals of said triangular wave oscillator means, and a transistor switch element having a field effect with isolated gate and triggered by said comparator means.

7. An electronic device as claimed in claim 2, wherein said means for converting into pressure values only the current values relating to feeding of said lower tension comprises:
  an RC delay group connected to said oscillator circuits;
  an inverter group connected to said RC delay group;
  a sampling and holding circuit connected both to said inverter group and to said electrometer; and
  a converter circuit connected to said sampling and holding circuit for converting the current under pressure.

8. In an electronic device for feeding an ion pump and for improved measuring of the pressure in the pump, having a transformer and means for rectifying and filtering alternating current supplied by said transformer, the improvement wherein said transformer is controlled by means for cyclically applying to said ion pump a first relatively high tension and a second lower tension and further comprising an electrometer for detecting the current fed to said pump as well as means for converting into pressure values only the current values relating to feeding of said lower tension,
  wherein means for cylically applying to said ion pump a first relatively high tension and a second lower tension comprises transistor switch elements having a field effect with isolated gate,
  further comprising an electronic device comprising rectangular wave oscillator means and triangular wave oscillator means for generating a pulsed tension to be fed to said ion pump, comparator means for comparing the output signals of said rectangular wave oscillator means with the output signals of said triangular wave oscillator means, and a transistor switch element having a field effect with isolated gate and triggered by said comparator means.

9. In an electronic device for feeding an ion pump and for improved measuring of the pressure in the pump, having a transformer and means for rectifying and filtering alternating current supplied by said transformer, the improvement wherein said transformer is controlled by means for cyclically applying to said ion pump a first relatively high tension and a second lower tension and further comprising an electrometer for detecting the current fed to said pump as well as means for converting into pressure values only the current values relating to feeding of said lower tension,
  wherein said transformer has a primary winding divided into two sections and further comprising switch means for separately or jointly activating said sections, and oscillator circuits for cyclically actuating said switch means for feeding said ion pump with said first relatively high tension and said second lower tension,
  wherein said means for converting into pressure values only the current values relating to feeding of said lower tension comprises:
  an RC delay group connected to said oscillator circuits;
  an inverter group connected to said RC delay group;
  a sampling and holding circuit connected both to said inverter group and to said electrometer; and
  a converter circuit connected to said sampling and holding circuit for converting the current under pressure.

* * * * *